(12) United States Patent
Bell et al.

(10) Patent No.: US 8,312,263 B2
(45) Date of Patent: Nov. 13, 2012

(54) SYSTEM AND METHOD FOR INSTALLING TRUST ANCHORS IN AN ENDPOINT

(75) Inventors: Robert T. Bell, Bountiful, UT (US); Douglas Q. Dexter, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1132 days.

(21) Appl. No.: 11/042,618

(22) Filed: Jan. 25, 2005

(65) Prior Publication Data

US 2006/0174124 A1    Aug. 3, 2006

(51) Int. Cl.
*H04L 29/06* (2006.01)
*H04L 9/32* (2006.01)

(52) U.S. Cl. ......... 713/156; 713/157; 713/167; 713/175

(58) Field of Classification Search .................. 713/150, 713/155–158, 168–170, 175; 726/1–6, 10, 726/18–20
See application file for complete search history.

(56) References Cited

U.S. PATENT DOCUMENTS

| | | | |
|---|---|---|---|
| 5,841,865 A * | 11/1998 | Sudia | 380/286 |
| 6,192,130 B1 * | 2/2001 | Otway | 380/277 |
| 6,233,341 B1 | 5/2001 | Riggins | |
| 6,381,698 B1 * | 4/2002 | Devanbu et al. | 713/170 |
| 6,490,367 B1 * | 12/2002 | Carlsson et al. | 382/137 |
| 6,516,316 B1 | 2/2003 | Ramasubramani et al. | |
| 6,769,000 B1 | 7/2004 | Akhtar et al. | 707/103 |
| 6,789,194 B1 | 9/2004 | Lapstun et al. | 713/176 |
| 6,792,165 B1 | 9/2004 | Silverbrook et al. | 382/314 |
| 6,795,593 B2 | 9/2004 | Silverbrook et al. | 382/313 |
| 6,813,039 B1 | 11/2004 | Silverbrook et al. | 358/1.18 |
| 6,816,871 B2 | 11/2004 | Lee | 707/104.1 |
| 6,816,900 B1 * | 11/2004 | Vogel et al. | 709/225 |
| 6,822,639 B1 | 11/2004 | Silverbrook et al. | 345/173 |
| 6,980,660 B1 | 12/2005 | Hind et al. | |
| 6,981,147 B1 * | 12/2005 | Hamann et al. | 713/175 |
| 7,028,180 B1 * | 4/2006 | Aull et al. | 713/156 |
| 7,143,165 B2 * | 11/2006 | Vogel et al. | 709/225 |
| 2002/0026582 A1 * | 2/2002 | Futamura et al. | 713/170 |
| 2002/0056747 A1 * | 5/2002 | Matsuyama et al. | 235/382 |
| 2002/0087859 A1 * | 7/2002 | Weeks et al. | 713/156 |

(Continued)

FOREIGN PATENT DOCUMENTS

WO    WO03007203 A2 *    1/2003

OTHER PUBLICATIONS

"Webster's Ninth New Collegiate Dictionary," 1991, Merriam-Webster Inc.*

(Continued)

*Primary Examiner* — Darren B Schwartz
(74) *Attorney, Agent, or Firm* — Baker Botts L.L.P.

(57) ABSTRACT

According to one embodiment of the present invention, a method of updating a certificate trust list on a first endpoint includes receiving an initial certificate trust list at the first endpoint. The initial certificate trust list includes authentication data for at least a second endpoint. Digitally signed information is received at the first endpoint and authentication is initiated against the authentication data for the at least a second endpoint. The authentication occurs only if the digital signature is complementary to the authentication data for the at least a second endpoint. After successful authentication, the initial certificate trust list is updated with the information to yield an updated certificate trust list.

23 Claims, 4 Drawing Sheets

U.S. PATENT DOCUMENTS

| | | | |
|---|---|---|---|
| 2002/0166049 A1* | 11/2002 | Sinn | 713/175 |
| 2003/0014629 A1* | 1/2003 | Zuccherato | 713/156 |
| 2003/0130947 A1* | 7/2003 | Benantar | 705/44 |
| 2003/0159054 A1 | 8/2003 | Fauble et al. | |
| 2003/0163685 A1* | 8/2003 | Paatero | 713/155 |
| 2003/0196084 A1 | 10/2003 | Okereke et al. | |
| 2004/0005051 A1 | 1/2004 | Wheeler et al. | |
| 2004/0181469 A1* | 9/2004 | Saeki | 705/30 |
| 2004/0193872 A1* | 9/2004 | Saarepera et al. | 713/156 |
| 2005/0005097 A1 | 1/2005 | Murakawa | |
| 2005/0033957 A1* | 2/2005 | Enokida | 713/156 |
| 2005/0076198 A1 | 4/2005 | Skomra et al. | |
| 2005/0160259 A1 | 7/2005 | Ogura et al. | |
| 2005/0257058 A1* | 11/2005 | Yoshida et al. | 713/175 |
| 2006/0168443 A1* | 7/2006 | Miller et al. | 713/156 |

OTHER PUBLICATIONS

U.S. Patent Application entitled "System and Method for Obtaining a Digital Certificate for an Endpoint", filed on Jan. 25, 2005, 38 pages.

Network Associates, Inc., "An Introduction to Cryptography", Copyright 1990-1999, cover pages, Table of Contents, pp. 11-84 and Index pages.

U.S. Patent and Trademark Office, Office Action for U.S. Appl. No. 11/042,901, filed Jan. 25, 2005, Robert T. Bell et al., Electronically Mailed Sep. 5, 2008.

U.S. Patent and Trademark Office, Office Action for U.S. Appl. No. 11/042,901, filed Jan. 25, 2005, Robert T. Bell et al., Electronically Mailed Jan. 22, 2009.

U.S. Patent and Trademark Office, Final Office Action for U.S. Appl. No. 11/042,901, filed Jan. 25, 2005, Robert T. Bell et al., Electronically Mailed Aug. 4, 2009.

U.S. Patent and Trademark Office, Office Action for U.S. Appl. No. 11/042,901, filed Jan. 25, 2005, Robert T. Bell et al., Electronically Mailed Nov. 30, 2009.

U.S. Patent and Trademark Office, Final Office Action for U.S. Appl. No. 11/042,901, filed Jan. 25, 2005, Robert T. Bell et al., Electronically Mail May 27, 2010.

* cited by examiner

FIG. 4

SYSTEM AND METHOD FOR INSTALLING TRUST ANCHORS IN AN ENDPOINT

TECHNICAL FIELD OF THE INVENTION

This invention relates in general to the field of communications and, more particularly, to a system and method for installing trust anchors in an endpoint.

BACKGROUND OF THE INVENTION

Public key encryption (PKE) is an asymmetric form of encryption that utilizes two keys for each endpoint, a public key and a private key. The private key is kept private by the endpoint, while the complementary public key is made publicly available. Information encrypted with a public key can be unencrypted with a private key, and information encrypted with a private key can be unencrypted with a public key. The public key infrastructure (PKI) uses public key encryption to provide authentication of endpoints.

Information may be encrypted with a first endpoint's private key and transmitted to a second endpoint. The second endpoint uses the first endpoint's complementary public key to decrypt the encrypted information thereby authenticating the first endpoint. The second endpoint can also encrypt information with the second entity's private key, and the first endpoint can decrypt the encrypted information with second entity's public key in order to authenticate the second endpoint.

SUMMARY OF THE INVENTION

According to one embodiment of the present invention, a method of updating a certificate trust list on a first endpoint includes receiving an initial certificate trust list at the first endpoint. The initial certificate trust list includes authentication data for at least a second endpoint. Digitally signed information is received at the first endpoint and authentication is initiated against the authentication data for the at least a second endpoint. The authentication occurs only if the digital signature is complementary to the authentication data for the at least a second endpoint. After successful authentication, the initial certificate trust list is updated with the information to yield an updated certificate trust list.

According to another embodiment of the invention, a first endpoint comprises memory operable to store a certificate trust list and logic encoded in media. The certificate trust list comprises authentication data corresponding to at least a second endpoint. The logic encoded in media is operable to initiate authentication of the digital signature against authentication data for the at least a second endpoint, the authentication only occurring if the digital signature is complimentary to the authentication data for the at least a second endpoint; and after successful authentication, update the initial certificate trust list with the information to yield an updated certificate trust list.

Certain embodiments may provide a number of technical advantages. For example, a technical advantage of one embodiment may include the capability to authoritatively insert trust anchors into an endpoint without a need for user interaction. Other technical advantages of other embodiments may include the capability to dynamically insert new trust anchors in an endpoint by relying on existence of current trust anchors.

While specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

Figure 1:
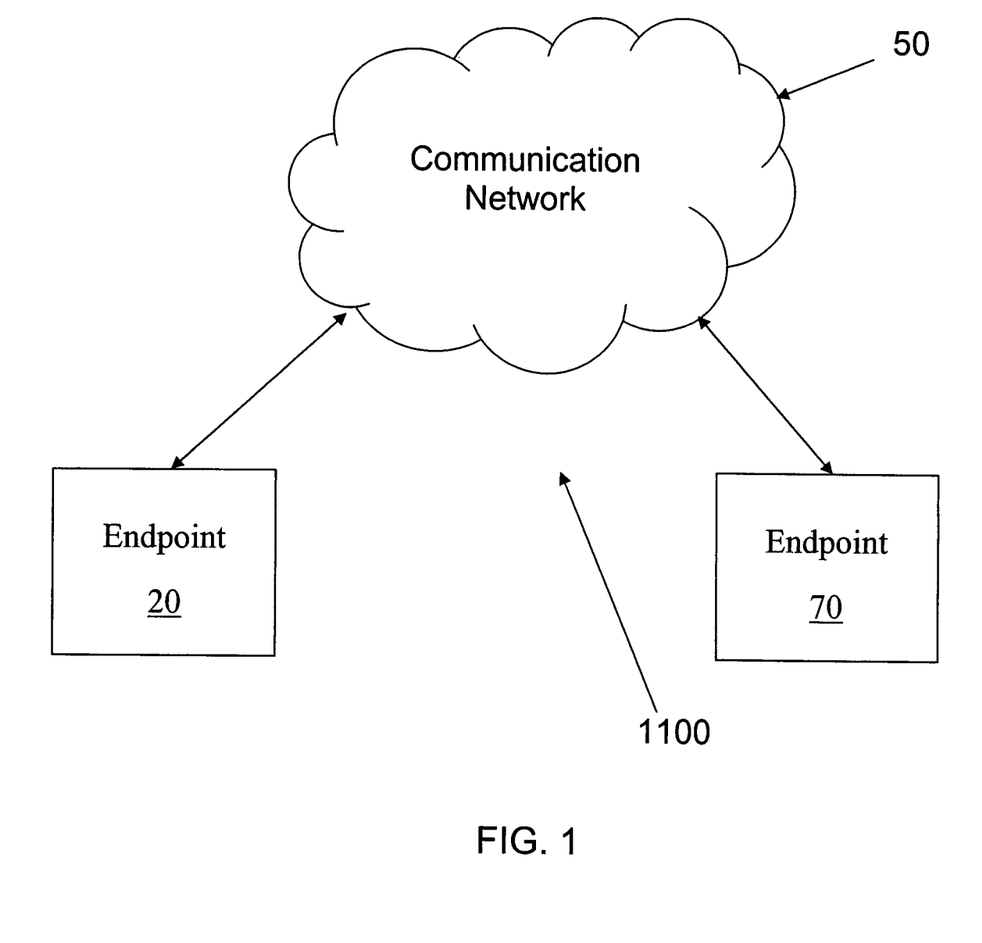
FIG. 1 is a simplified block diagram of a communication system for communication between two endpoints.

FIG. 1 is a simplified block diagram illustrative of a communication system 1100 that can be utilized to facilitate communication between an endpoint 20 and an endpoint 70 through a communication network 50. As used herein, "endpoint" may generally refer to any object, device, software, or any combination of the preceding that is generally operable to communicate with another endpoint. As an example, an endpoint may represent a user, which in turn may refer to a user profile representing a person. The user profile may comprise, for example, an address for the user, a user passcode, a user name, other user information, or any combination of the preceding.

As another example, an endpoint may represent a device that comprises any hardware, software, firmware, or combination thereof operable to communicate through the communication network 50. Examples of an endpoint include, but are not necessarily limited to, a computer, a switch, a personal digital assistant, a cellular telephone, or any other device or component of such device suitable for communicating information to and from the communication network 50. Endpoints may support Internet Protocol (IP) or other suitable communication protocols. Endpoints may additionally include a medium access control (MAC) and a physical layer (PHY) interface that conforms to IEEE 801.11. A device may have a device identifier such as the MAC address and may have a device profile that describes the device.

The communication network 50 may comprise all or a portion of a public switched telephone network (PSTN); a public or private data network; a local area network (LAN); a metropolitan area network (MAN); a wide area network (WAN); a global computer network such as the Internet; a wireline or wireless network; a local, regional, or global communication network; an enterprise intranet; other suitable communication links; or any combination of the preceding.

Authenticated communication can generally be established between endpoint 20 and endpoint 70 utilizing public key encryption. For example, endpoint 20 can encrypt or "digitally sign" information with a private key and transport the encrypted information to endpoint 70. Endpoint 70 can then decrypt or authenticate the information using a public key complementary to the private key that digitally signed the information. Endpoint 70 can reciprocally transport information back to endpoint 20 using a private key of the endpoint 70.

The term "digital signature", along with any variations thereof, may refer to any piece of data or information that can be authenticated with another piece of data or information. Encryption of information and the associated decryption of the information are but one process of authenticating information. While examples of a digital signature will be given herein with reference to a piece of information being digitally signed with a private key and then being authenticated with a public key, it should be expressly understood that a variety of other technologies, techniques, and processes may be utilized, including not only those that are now known, but also those that will be later developed. Examples include any suitable challenge-response systems and techniques. Embodiments of the invention, herein, are not intended as being limited to any one digital signature, authentication scheme, or both. Accordingly, references to private keys and public keys are intended as only being illustrative of one technique that can be utilized.

Difficulties in communication can arise when one endpoint falsely poses as other another endpoint by posting phony information in what is known as a man in the middle attack. As a simple example, a second endpoint may falsely pose as an online bank and request a first endpoint to log on or to send information encrypted with the first endpoint's private key. The first endpoint can unintentionally send encrypted information to the wrong second endpoint.

Digital certificates may be utilized to certify credentials associated with a public key in order to thwart such attacks. The term "digital certificate" may refer to a piece of data or information that has been "digitally signed"—signed by, for example, a certificate authority. Prior to issuing a digital certificate, a certificate authority typically (1) verifies an identity of an endpoint, and (2) verifies that the endpoint is in possession of a particular private key. A digital certificate typically includes the public key of the verified endpoint. Other information about the endpoint may also be included. The information is encrypted (e.g., "digitally signed") with the certificate authority's private key. The signed digital certificate (1) serves as proof of possession of a private key, and (2) operates to bind certain information (for example, identity) to a particular endpoint.

An endpoint may verify credentials of another endpoint by authenticating the digital signature of a digital certificate sent by the other endpoint with the certificate authority's public key. For example, a first endpoint may receive a digital certificate from a second endpoint. The first endpoint may authenticate the digital signature by decrypting the information within the digital certificate utilizing the pubic key of the certificate authority. Accordingly, endpoints can establish authenticated communication with one another by exchanging digital certificates.

An endpoint may have a list of trust anchors, or a certificate trust list. Such certificate trust lists can correspond to trusted certificate authorities or other trusted endpoints.

Endpoints of a certificate trust list may change. For example, a particular certificate authority may no longer be trusted or a new certificate authority may be added. The more comprehensive and up-to-date a certificate trust list is, the lower the risk of attacks and the greater the possibility that a particular endpoint's certificate will be recognized. Embodiments are directed towards storing a certificate trust list at an endpoint and dynamically and authoritatively updating the certificate trust list in a manner that requires no user intervention.

As used in this document, "each" may refer to each member of a set or each member of a subset of a set.

Figure 2:
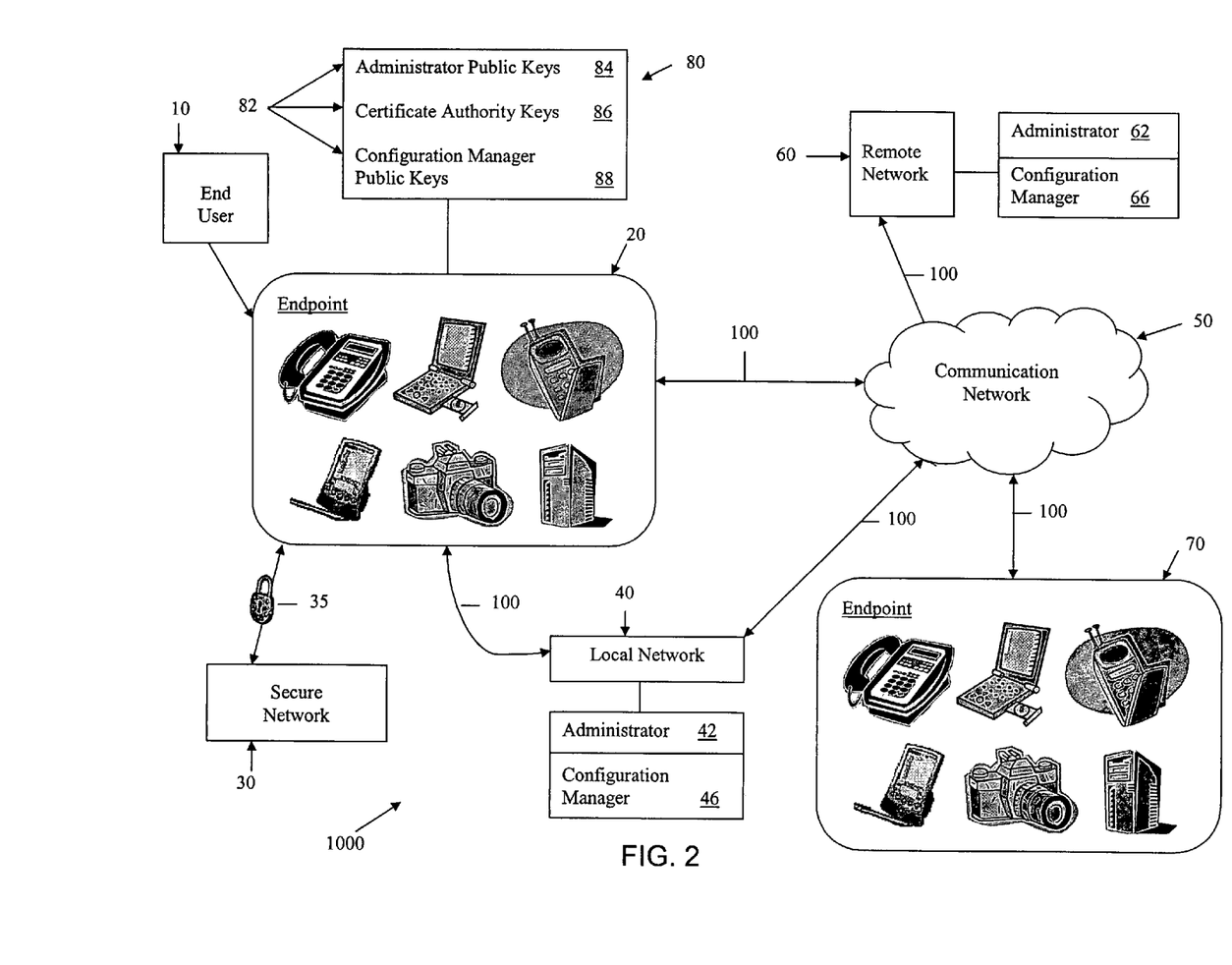
FIG. 2 is a simplified block diagram of a communication system for updating a certificate trust list on an endpoint in accordance with one embodiment of the present invention.

FIG. 2 is a simplified block diagram illustrating a communication system 1000 that can be utilized for updating a certificate trust list 80 on the endpoint 20. The communication system 1000 can generally include the endpoint 20, a local network 40, the communication network 50, a remote network 60, a secure network 30, and the endpoint 70 coupled as shown. The communication system 1000 generally connects several components with connections 100. The connections 100 can be any type of connection 100 either now known or later developed that is generally operable to facilitate communication. Examples of connections 100, include, but are not necessarily limited to, wire line and wireless connections.

The general architectural configuration of the communication system 1000 may be varied significantly, or alternatively substituted with any suitable networking components or elements that operate to provide a communicative platform. Further, although specific networking components are shown in the embodiment of FIG. 2, other embodiments may only utilize some or none of the networking components shown herein.

The endpoint 20,70 as referenced above can generally be any object, device, or software that is generally operable to facilitate communications. For purposes of illustration, examples of endpoint 20,70 are shown as a phone, a laptop, a mobile phone, a personal digital assistant, a camera, and a server. An end user 10 can access some, but not necessarily all, types of the endpoints 20. The endpoint 20 is generally operable to communicate with endpoint 70.

Several methods of establishing communications between the endpoint 20 and the endpoint 70 can be utilized. As a basic example, intended for illustrative purposes only, the endpoint 20 and the endpoint 70 can exchange digital certificates signed with the private keys of trusted certificate authorities. Each endpoint 20,70 may then have knowledge of information about the other endpoint 20,70. To facilitate this exchange, any of a variety of different exchange processes can be utilized.

The endpoint 20 generally includes a certificate trust list 80, associated therewith. The certificate trust list 80 contains a listing of public keys 82. Each public key 82 corresponds to a trusted endpoint. These public keys 82 may include certificate authorities keys 86, administrator public keys 84, configuration manager public keys 88, or any combination of the preceding. The certificate authority public keys 86 generally correspond to certificate authorities with privileges to bind particular information to other endpoints. The administrator public keys 84 correspond to administrators 42,62 with privileges to update the certificate trust list 80 and the public keys 82 thereon. The configuration manager public keys 88 correspond to configuration managers 46,66 with privileges to update a configuration setting on the endpoint 20. Each of these will be described in further detail below. While some embodiments may refer to "administrators" and "configuration managers" as separate endpoints, in other embodiments, they may be a single endpoint.

The local network 40 and the remote network 60 each generally represent a series of points or nodes of interconnected communication paths for receiving and transmitting information that propagates through communication system 1000. The local network 40 and the remote network 60 may be operable to facilitate a communication between the administrator 42, 62 and the endpoint 20 or the configuration manager 46, 66 and the endpoint 20.

The local network 40, the remote network 60, and the communication network 50, alone or in combination with one another, may be any local area network (LAN), wireless local area network (WLAN), metropolitan area network (MAN), virtual private network (VPN), wide area network (WAN), or any other suitable architecture or system that facilitates communications. In one example, the local network 40, the remote network 60, and the communication network 50 may implement an Internet Protocol (IP) communication configuration, whereby a user datagram protocol/Internet protocol (UDP/IP) language is provided. Other embodiments could include TCP, xxx/IP, or any other suitable transport, platform, or mechanism.

The administrator 42 and the configuration manager 46 are associated with the local network 40, while the administrator 62 and the configuration manager 66 are associated with the remote network 60. Accordingly, some administrators 62 and configuration managers 66 communicate with the endpoint through the communication network 50, while other administrators 42 and configurations managers 66 do not necessarily communicate with the endpoint through the communication network 50.

The secure network 30 can be similar to the local network 40 and the remote network 60. To ensure the integrity of the secure network 30, the communication link between the endpoint 20 and the secure network 30 may be a secure connection 35. In securing the secure network 30, preferably every endpoint connected to both the secure connection 35 and the secure network 30 is known and trusted. The secure network 30, as will be described in further details below, can be utilized to establish an initial certificate trust list 80 on an endpoint 20 containing no certificate trust list 80.

Modifications, additions, or omissions may be made to systems 1000, 1100 of FIGS. 1 and 2 without departing from the scope of the invention. The components of the systems 1000, 1100 may be integrated or separated according to particular needs. Moreover, the operations of the systems 1000, 1100 may be performed by more, fewer, or other modules. Additionally, operations of systems 1000, 1100 may be performed using any suitable logic comprising software, hardware, other logic, or any suitable combination of the preceding.

Figure 3:
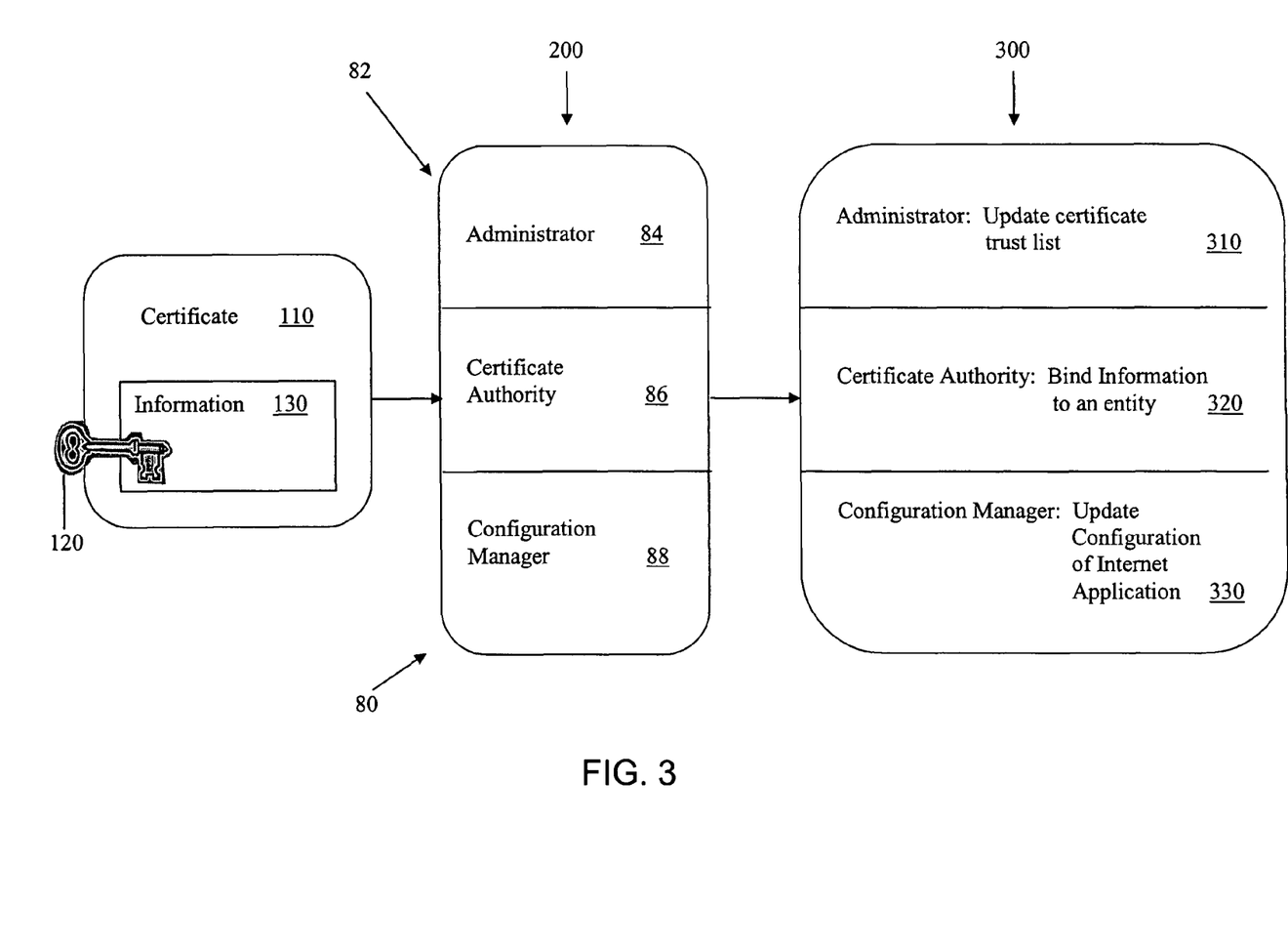
FIG. 3 is a simplified block diagram illustrating schematically the receipt and processing of information received at an endpoint in accordance with one embodiment of the present invention.

FIG. 3 is a simplified block diagram illustrating schematically the receipt and processing of information received at an endpoint 20. With reference to FIG. 2 and FIG. 3, the following is an illustrative example of an interaction of the endpoint 20 with another endpoint. The other endpoint (for example, the administrator 42, 62, the configuration manager 46, 66, or the endpoint 70) can transmit information 130 to the endpoint 20. The information 130 is digitally signed with a private key 120 to form a digital certificate 110. The endpoint 20, upon receiving the digital certificate 110, initiates an authentication process 200 to authenticate the digital signature of the other endpoint. In the authentication process 200, the endpoint 20 cross-references the certificate trust list 80 to find a public key 82 paired with the private key 120. If no key is found, the information 130 is rejected and authentication fails.

If a key is found, authentication is approved and the endpoint 20 initiates a process 300 of verifying privileges of the other endpoint. The privileges define further action that can be taken. For example, administrator privileges 310 allow the other endpoint to update the certificate trust list 80. Certificate authority privileges 320 allow the other endpoint to bind information 130 to another endpoint, for example, to establish a communication link. Configuration manager privileges 330 allow the other endpoint to update configuration settings on the endpoint 20. While such privileges are shown in this embodiment, other embodiments may have other privileges.

Hierarchical privileges may be established using the above privileges model. According to a hierarchical privilege model, a higher privileged endpoint can define actions that a lower privileged can take, but not vice versa. As an example, an endpoint corresponding to a master administrative public key (not expressly shown) can update every public key 82 in the certificate trust list 80. An endpoint corresponding to an administrator public key 84 can update every public key 82 other than the master administrative public key. The endpoints corresponding to the configuration manager public keys 88 can update configuration settings on the endpoint 20, while the endpoints corresponding to the certificate authority public keys 86 can bind information to a particular endpoint.

An updating of public keys 82 can involve adding new public keys 82 associated with particular endpoints, renewing public keys 82 associated with particular endpoints, and removing public keys 82 associated with particular endpoints. An update to the public keys 82 can be an update to one or more administrator public keys 84, certificate authority public keys 86, configuration manager public keys 88, or any combination of the preceding.

An update of the certificate authority public keys 86 identifies which certificate authorities can currently be trusted to bind information to a particular endpoint. An update of the configuration manager public keys 86 define which endpoints can update a configuration of the endpoint 20. Such configurations can include, but are not necessarily limited to, firmware updates, and setting updates. As an example of setting updates, the endpoint 20 may contain a setting that lists authorized endpoints 70 to which the endpoint 20 can communicate. Thus, for example, the endpoint 70 may transfer a digital certificate 110 digitally signed by a trusted certificate authority; however, the endpoint 70 may be blocked from communication with the endpoint 20 based on the configuration setting on the endpoint 20.

While a specific process 200 of authentication is described with this embodiment, it should be understood that other authentication processes can be utilized in other embodiments. For example, in other embodiments, the authentication can involve multiple challenges and/or multiple authentication schemes. Such multiple authentication schemes can include information 130 that is digitally signed with multiple digital signatures.

The process 300 of verifying privileges prevents endpoints without administrator privileges 310 from updating the certificate trust list 80. Additionally, the system prevents endpoints without configuration manager privileges 330 from updating the configuration settings of the endpoint 20.

While the process 300 of verifying privileges and the process 200 of authentication have been described as two processes in this embodiment, in other embodiments the process 200 and the process 300 can be integrated into a single process. To facilitate the process 200 of authentication and the process 300 of verifying privileges, a variety of different hardware, software, or combination of hardware and software implementations can be utilized on the endpoint 20.

With the above embodiment of a system and method, it can be seen that a certificate trust list 80 on an endpoint 20 can be dynamically updated without user interaction.

Figure 4:
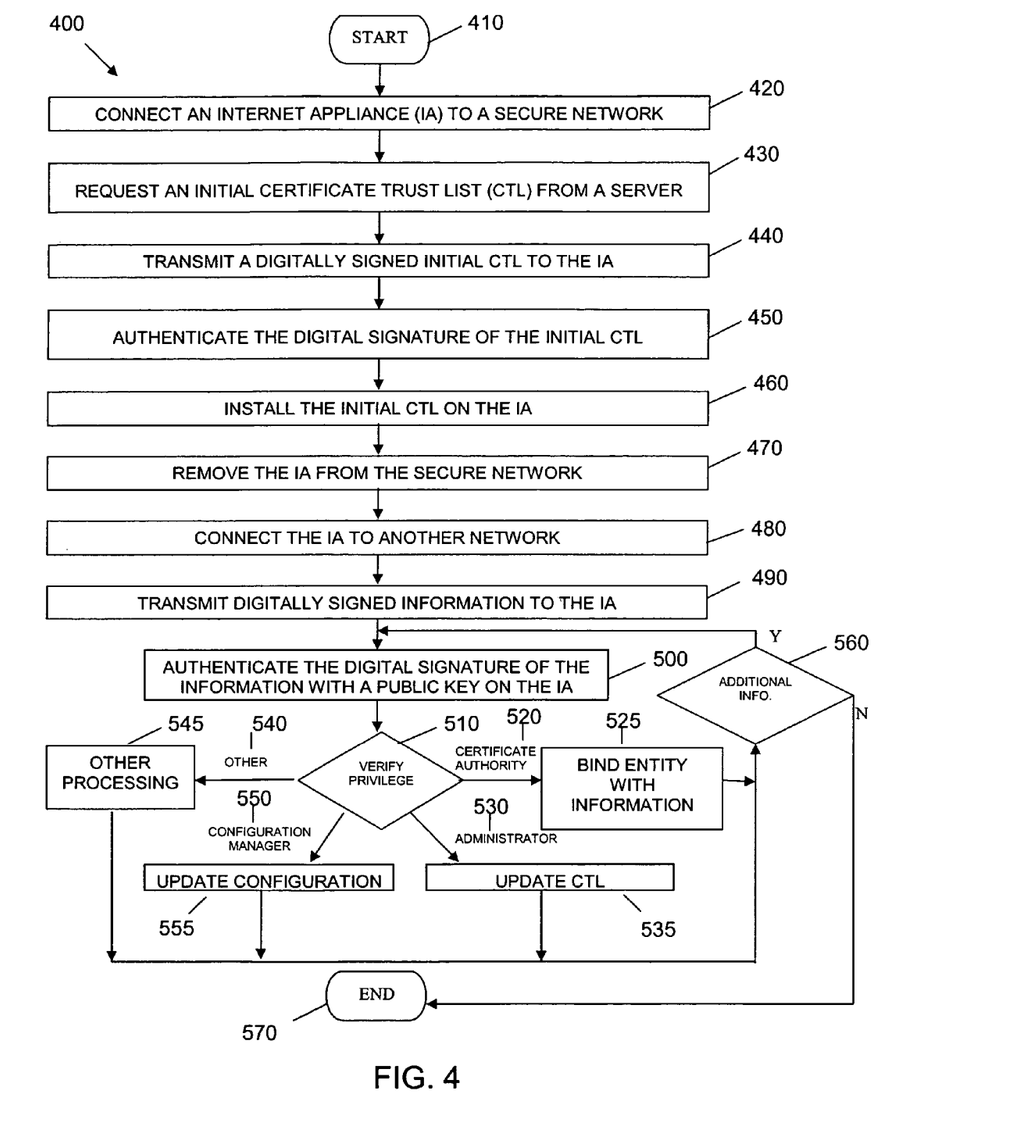
FIG. 4 is a flowchart illustrating a series of example steps associated with a method for updating a certificate trust list on an endpoint in accordance with one embodiment of the present invention.

FIG. 4 is a flowchart illustrating a series of example steps associated with a method for updating a certificate trust list 80 on the endpoint 20. The process 400 begins at step 410. In some embodiments, the endpoint 20 at step 410 may not have a certificate trust list 80. Therefore, the endpoint 20 is initially connected to the secure network 30 at a step 420. The secure network 30 is utilized to minimize the likelihood that an unauthorized certificate trust list 80 would initially be added to the endpoint 20. When the endpoint 20 is connected to the secure network 30, a dynamic host configuration protocol (DHCP) request can be initiated and an Internet Protocol address can be assigned to the endpoint 20 to facilitate communication.

An initial certificate trust list 420 can be requested from a server on the secure network 30 at step 430. This request can either be initiated automatically or manually. The initial certificate trust list 80 is transmitted to the endpoint 20 at step 440. The initial certificate trust list 80 may be digitally signed with a private key 120 of an administrator endpoint. Upon receipt of this initial certificate trust list 80, the endpoint 20 initiates authentication at step 450.

As the endpoint 20 may have no public keys 82 thereon, the authentication process at step 450 may involve a self-authentication process. In other words, the initial certificate trust list 80 may be authenticated by an administrative public key 84 contained on the initial certificate trust list 80. Upon a successful authentication, the initial certificate trust list is installed at the endpoint 20.

At step 470, the endpoint 20 is removed from the secure network 30 in preparation for step 480, which involves connecting the endpoint 20 to another network. The other network may be the local network 40, the communication network 50, or the remote network 60. When the endpoint 20 is connected to the other network, a DHCP request can be initiated and an Internet Protocol address can be assigned to the endpoint 20 to facilitate communication. At step 490, information 130 is transmitted to the endpoint 20. The information 130 is signed with a private key 120. The information 130 can be a variety of different information. For example, it can be information 130, signed by a certificate authority, an administrator 42,62, or a configuration manager 46,66.

The private key 120 is authenticated by reviewing the public keys 82 on the certificate trust list 80 at a step 500. The public keys 82 can be public keys 82 that were initially established when the endpoint 20 was connected to the secure network 30. Alternatively, the public keys 82 can established via previous updates to the certificate trust list 80.

Upon a successful authentication, step 510 involves a verification of the privileges of the endpoint digitally signing the information 130. Verification may involve a recognition that a particular public key 82 falls into a particular category that allows certain privileges such as certificate authority, administrator, configuration manager, etc.

If a certificate authority privilege 520 is verified, the process 400 moves to a step 525 for a binding of information to another endpoint. Such a binding, in turn, can be utilized to establish communication with the endpoint.

If an administrator privilege 530 is verified the process 400 moves to a step 535 for an updating of the certificate trust list 80. Such an update can involve adding new public keys 82 associated with endpoints, renewing public keys 82 associated with particular endpoints, and removing public keys 82 associated with endpoints.

If a configuration manager privilege 550 is verified, the process 400 moves to a step 555 for a variety of updates to the configuration setting of the endpoint 20, including setting updates and firmware updates.

A variety of other privileges 540 can additionally be created to define other processing at a step 545 with respect to the endpoint 20. Such other privileges 540 can have a separate public key 82 associated therewith.

The process 400 continues by inquiring at step 560 whether or not there is additional information to be authenticated. If the answer is in the affirmative, the process 400 loops back to step 500. If the answer in in the negative, the process 400 ends at step 570.

In some embodiments, steps 410, 420, 430, 440, 450, 460, and 470 can be accomplished at a location remote from the remaining steps. For example, steps 410, 420, 430, 440, 450, 460, and 470 may be accomplished at a manufacturer's facility.

With any of these processes, a variety of different logic encoded in media can be utilized—some of which may be dependent on the particular endpoint 20 being utilized and/or the type of endpoint that is communicating with the endpoint 20.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A method of updating a certificate trust list on a first endpoint, comprising:

receiving an initial certificate trust list at the first endpoint, the initial certificate trust list comprising authentication data for at least one second endpoint, wherein the first endpoint comprises a communications device and the initial certificate trust list is authenticated at the first endpoint using a self-authentication process while the first endpoint is coupled to a secure communications network;

receiving information at the first endpoint, the information signed with a digital signature of the at least one second endpoint, the information containing updates to the certificate trust list and a configuration setting of the first endpoint;

initiating authentication of the digital signature against the authentication data for the at least one second endpoint, the authentication occurring only when the digital signature is complementary to the authentication data for the at least one second endpoint;

initiating verification of a privilege of the at least one second endpoint prior to updating at least one of the initial certificate trust list and the configuration setting at the first endpoint with the received information by determining that verification data for the at least one second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and after successful authentication and verification, updating at least one of the initial certificate trust list and the configuration setting with the received information to yield at least one of an updated certificate trust list and an updated configuration setting.

2. The method of claim 1, wherein updating the initial certificate trust lists further comprises: adding authentication data corresponding to at least one third endpoint.

3. The method of claim 1, wherein updating the initial certificate trust list further comprises: removing authentication data corresponding to the at least one second endpoint.

4. The method of claim 1, wherein updating the initial certificate trust list further comprises: renewing authentication data corresponding to the at least one second endpoint.

5. The method of claim 1, wherein the updated configuration setting comprises an update to firmware.

6. The method of claim 1, wherein the initial certificate trust list is digitally signed with a private key of an administrator and the self-authentication process comprises authenticating the initial certificate trust list with an administrative public key included in the initial certificate trust list.

7. A method of updating a certificate trust list on a first endpoint, comprising:
digitally signing information with a digital signature of a second endpoint, the information containing updates to the certificate trust list and a configuration setting on a first endpoint;
transmitting the information across a communications network to the first endpoint at a communications device coupled to the first endpoint and coupled to the communications network, wherein:
the first endpoint comprises verification data and an initial certificate trust list comprising authentication data for the second endpoint, wherein the initial certificate trust list is authenticated at the first endpoint using a self-authentication process while the first endpoint is coupled to a secure communications network;
the first endpoint authenticates the digital signature with the authentication data for the second endpoint;
the first endpoint verifies a privilege of the second endpoint prior to updating at least one of the initial certificate trust list and the configuration setting at the first endpoint with the received information by determining that the verification data for the second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and
after successful authentication and verification, the first endpoint updates at least one of the initial certificate trust list and the configuration setting with the received information to yield at least one of an updated certificate trust list and an updated configuration setting.

8. A system for updating a certificate trust list on a first endpoint, the system comprising:
a communication medium, operable to transmit information to the first endpoint, the information signed with a digital signature of at least one second endpoint and containing updates to the certificate trust list and a configuration setting on a first endpoint; and
the first endpoint comprising:
memory operable to store a certificate trust list and verification data, the certificate trust list comprising authentication data corresponding to the at least one second endpoint; and
logic encoded in a computer readable media, operable to:
authenticate the certificate trust list at the first endpoint using a self-authentication process while the first endpoint is coupled to a secure communications network;
initiate authentication of the digital signature against authentication data for the at least one second endpoint, the authentication occurring only when the digital signature is complementary to the authentication data for the at least one second endpoint,
initiate verification of privilege of the at least one second endpoint at the first endpoint with the received information by determining that the verification data for the at least one second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and
after successful authentication and verification, update at least one of the initial certificate trust list and the configuration setting with the received information to yield at least one of an updated certificate trust list and an updated configuration setting.

9. Logic encoded in a non-transitory computer readable media such that when executed is operable to:
digitally sign information with a digital signature of a second endpoint, the information containing updates to a certificate trust list and a configuration setting on a first endpoint; and
transmit the information across a communications network to the first endpoint at a communications device coupled to the first endpoint and coupled to the communications network, wherein:
the first endpoint comprises verification data and an initial certificate trust list comprising authentication data for the second endpoint, wherein the initial certificate trust list is authenticated at the first endpoint using a self-authentication process while the first endpoint is coupled to a secure communications network;
the first endpoint authenticates the digital signature with the authentication data for the second endpoint;
the first endpoint verifies a privilege of the second endpoint prior to updating at least one of the initial certificate trust list and the configuration setting at the first endpoint with the received information by determining that the verification data for the second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and
after successful authentication and verification, the first endpoint updates at least one of the initial certificate trust list and the configuration setting with the received information to yield at least one of an updated certificate trust list and an updated configuration setting.

10. An apparatus comprising:
means for digitally signing information with a digital signature of a second endpoint, the information containing updates to a certificate trust list and a configuration setting on a first endpoint; and
means for transmitting the information to the first endpoint wherein:
the first endpoint comprises verification data and an initial certificate trust list comprising authentication data for the second endpoint, wherein the initial certificate trust list is authenticated at the first endpoint using a self-authentication process while the first endpoint is coupled to a secure communications network;
the first endpoint authenticates the digital signature with the authentication data for the second endpoint;
the first endpoint verifies a privilege of the second endpoint prior to updating at least one of the initial certificate trust list and the configuration setting at the first endpoint with the received information by determining that the verification data for the second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and
after successful authentication and verification, the first endpoint updates at least one of the initial certificate trust list and the configuration setting with the received information to yield at least one of an updated certificate trust list and an updated configuration setting.

11. Logic encoded in a non-transitory computer readable media such that when executed is operable to:
receive an initial certificate trust list at a first endpoint, the initial certificate trust list comprising authentication data for at least one second endpoint and information to update the certificate trust list and a configuration setting on the first endpoint, wherein the first endpoint comprises a communications device and the initial certificate trust list is authenticated at the first endpoint using a self-authentication process while the first endpoint is coupled to a secure communications network;
receive updates at the first endpoint, the updates signed with a digital signature;
initiate authentication of the digital signature against authentication data for the at least one second endpoint, the authentication occurring only when the digital signature is complementary to the authentication data for the at least one second endpoint;
initiate verification of a privilege of the at least one second endpoint prior to the update of at least one of the initial certificate trust list and the configuration setting at the first endpoint with the received information by determining that verification data for the at least one second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and
after successful authentication and verification, update at least one of the initial certificate trust list and the configuration setting with the received updates to yield at least one of an updated certificate trust list and an updated configuration setting.

12. The logic of claim 11, wherein the logic in the update to the initial certificate trust list is further operable to:
add authentication data corresponding to at least a third endpoint in the update to the initial certificate trust list.

13. The logic of claim 11, wherein the logic in the update to the initial certificate trust list is further operable to: remove authentication data corresponding to the at least one second endpoint in the update to the initial certificate trust list.

14. The logic of claim 11, wherein the logic in the updated to the initial certificate trust list is further operable to: renew authentication data corresponding to the at least one second endpoint the at least one of the plurality of additional endpoints in the update to the initial certificate trust list.

15. The logic of claim 11, wherein the updated configuration setting comprises an update to firmware.

16. The logic of claim 11, wherein the initial certificate trust list is digitally signed with a private key of an administrator and the self-authentication process comprises authenticating the initial certificate trust list with an administrative public key included in the initial certificate trust list.

17. An apparatus comprising:
means for receiving an initial certificate trust list at a first endpoint, the initial certificate trust list comprising authentication data for at least one second endpoint, wherein the initial certificate trust list is authenticated at the first endpoint using a self-authentication process while the first endpoint is coupled to a secure communications network;
means for receiving information at the first endpoint, the information signed with a digital signature and containing updates to the certificate trust list and a configuration setting;
means for initiating authentication of the digital signature against the authentication data for the at least one second endpoint, the authentication occurring only when the digital signature is complementary to the authentication data for the at least one second endpoint;
means for initiating verification of a privilege of the at least one second endpoint prior to updating at least one of the initial certificate trust list and the configuration setting at the first endpoint with the received information by determining that verification data for the at least one second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and
after successful authentication and verification, means for updating at least one of the initial certificate trust list and the configuration setting with the received information to yield at least one of an updated certificate trust list and an updated configuration setting.

18. The apparatus of claim 17, wherein the means for updating the initial certificate trust lists further comprises:
means for adding authentication data corresponding to at least a third endpoint.

19. The apparatus of claim 17, wherein the means for updating the initial certificate trust list further comprises:
means for removing authentication data corresponding to the at least one second endpoint.

20. The apparatus of claim 17, wherein the means for updating the initial certificate trust list further comprises:
  means for renewing authentication data corresponding to the at least one second endpoint.

21. The apparatus of claim 17, wherein the updated configuration setting comprises an update to firmware.

22. The apparatus of claim 17, wherein the initial certificate trust list is digitally signed with a private key of an administrator and the self-authentication process comprises authenticating the initial certificate trust list with an administrative public key included in the initial certificate trust list.

23. A method of updating a certificate trust list on a first endpoint, comprising:
  receiving an initial certificate trust list at the first endpoint, the initial certificate trust list comprising authentication data for at least one second endpoint and containing information to update the certificate trust list and a configuration setting on the first endpoint, wherein the first endpoint comprises a communications device and the initial certificate trust list is authenticated at the first endpoint using a self-authentication process while the first endpoint is coupled to a secure communications network;
  receiving updates at the first endpoint, the updates signed with a digital signature;
  initiating authentication of the digital signature against the authentication data for the at least one second endpoint, the authentication occurring only when the digital signature is complementary to the authentication data for the at least one second endpoint;
  initiating verification of a privilege of the at least one second endpoint by determining that verification data for the at least one second endpoint falls into a particular category, wherein the initial certificate trust list is updated at the first endpoint with the received information only when the particular category indicates the privilege of an administrator, and wherein the configuration setting is updated at the first endpoint with the received information only when the particular category indicates the privilege of a configuration manager; and
  after successful authentication and verification, updating at least one of the initial certificate trust list and the configuration setting with the received updates to yield at least one of an updated certificate trust list and an updated configuration setting, wherein updating the initial certificate trust lists comprises:
  adding authentication data corresponding to at least a third endpoint; and
  a selected one of removing authentication data corresponding to the at least one second endpoint and renewing authentication data corresponding to the at least one second endpoint.

* * * * *